United States Patent
Feng et al.

(10) Patent No.: US 12,014,657 B2
(45) Date of Patent: Jun. 18, 2024

(54) FOLDABLE DISPLAY PANEL AND FOLDABLE DISPLAY APPARATUS

(71) Applicant: Hefei Visionox Technology Co., Ltd., Anhui (CN)

(72) Inventors: Hongqing Feng, Anhui (CN); Hongrui Li, Anhui (CN); Lijun Zhao, Anhui (CN); Bing Zhang, Anhui (CN); Cuili Gai, Anhui (CN); Liwei Ding, Anhui (CN)

(73) Assignee: Hefei Visionox Technology Co., Ltd., Hefei (CN)

( * ) Notice: Subject to any disclaimer, the term of this patent is extended or adjusted under 35 U.S.C. 154(b) by 243 days.

(21) Appl. No.: 17/842,325

(22) Filed: Jun. 16, 2022

(65) Prior Publication Data
US 2022/0327969 A1    Oct. 13, 2022

Related U.S. Application Data

(63) Continuation of application No. PCT/CN2021/089049, filed on Apr. 22, 2021.

(30) Foreign Application Priority Data

Jun. 15, 2020  (CN) .......................... 202010543261.3

(51) Int. Cl.
*G09F 9/30*     (2006.01)
*G06F 1/16*     (2006.01)

(52) U.S. Cl.
CPC ............ *G09F 9/301* (2013.01); *G06F 1/1616* (2013.01); *G06F 1/1641* (2013.01); *G06F 1/1652* (2013.01)

(58) Field of Classification Search
CPC ........................................................ G09F 9/301
See application file for complete search history.

(56) References Cited

U.S. PATENT DOCUMENTS 9,655,235 B2 * 5/2017 Hwang ................... G09F 9/301
9,891,670 B2 * 2/2018 Kim ..................... G06F 1/1675
(Continued)

FOREIGN PATENT DOCUMENTS

CN          1977301 A      6/2007
CN        108470753 A      8/2018
(Continued)

OTHER PUBLICATIONS

PCT International Search Report for International Application No. PCT/CN2021/089049 dated Jul. 19, 2021.
(Continued)

*Primary Examiner* — Lisa Lea-Edmonds
(74) *Attorney, Agent, or Firm* — Rimon PC

(57) ABSTRACT

Disclosed are a foldable display panel and a foldable display apparatus. The foldable display panel includes a first display area and a second display area which are connected in a foldable manner. When the foldable display panel is in a first state, the first display area is light-emitted and the second display area is not light-emitted; and when the foldable display panel is in a second state, both the first display area and the second display area are light-emitted. A density of a drive current of the second display area is set to be greater than a density of a drive current of the first display area when the first display area and the second display area are in the second state.

17 Claims, 2 Drawing Sheets

(56) References Cited

U.S. PATENT DOCUMENTS

| | | | |
|---|---|---|---|
| 10,043,421 B2* | 8/2018 | Koo | G09F 9/301 |
| 10,254,803 B1* | 4/2019 | Quinn | G06F 1/1688 |
| 10,296,053 B1* | 5/2019 | Quinn | G06F 3/0487 |
| 10,452,106 B2* | 10/2019 | Cho | G06F 1/1656 |
| 10,503,211 B2* | 12/2019 | Yee | G06F 1/1652 |
| 11,086,356 B2* | 8/2021 | Hou | E05D 3/122 |
| 11,116,094 B2* | 9/2021 | Zhao | G06F 1/1616 |
| 11,343,923 B2* | 5/2022 | Hou | H04M 1/022 |
| 11,829,200 B2* | 11/2023 | Lee | G06F 1/1681 |
| 11,886,252 B2* | 1/2024 | Kim | G06F 3/0488 |
| 11,914,430 B2* | 2/2024 | Hou | H04M 1/0268 |
| 11,934,651 B2* | 3/2024 | Ahn | G06F 1/1616 |
| 2014/0285449 A1* | 9/2014 | Cho | G06F 3/04886 345/173 |
| 2015/0054815 A1 | 2/2015 | Toyoda et al. | |
| 2016/0184700 A1* | 6/2016 | Lee | G06F 3/1423 463/31 |
| 2016/0212840 A1* | 7/2016 | Koo | G06F 1/1652 |
| 2016/0284272 A1* | 9/2016 | Her | G09G 3/035 |
| 2017/0075388 A1* | 3/2017 | Yee | G06F 1/1643 |
| 2018/0113520 A1* | 4/2018 | Klein | G06F 1/1641 |
| 2020/0192432 A1* | 6/2020 | Yee | G06F 1/1641 |
| 2020/0267851 A1* | 8/2020 | Hou | H05K 5/0226 |
| 2021/0325941 A1* | 10/2021 | Hou | G06F 1/1616 |
| 2022/0327969 A1* | 10/2022 | Feng | G06F 1/1641 |
| 2022/0390986 A1* | 12/2022 | Pan | G06F 1/1641 |
| 2023/0409084 A1* | 12/2023 | Yee | G06F 1/1643 |

FOREIGN PATENT DOCUMENTS

| | | |
|---|---|---|
| CN | 110164398 A | 8/2019 |
| CN | 110619819 A | 12/2019 |
| CN | 110808006 A | 2/2020 |
| CN | 110910772 A | 3/2020 |
| CN | 111009567 A | 4/2020 |
| CN | 111508379 A | 8/2020 |

OTHER PUBLICATIONS

PCT Written opinion for International Application No. PCT/CN2021/089049 dated Jul. 19, 2021.

Chinese first office action for application No. 202010543261.3 dated Jun. 29, 2021.

* cited by examiner

FOLDABLE DISPLAY PANEL AND FOLDABLE DISPLAY APPARATUS

CROSS-REFERENCE TO RELATED APPLICATIONS

This application is a continuation of International Application No. PCT/CN2021/089049, filed on Apr. 22, 2021, which claims priority to Chinese Patent Application No. 202010543261.3, filed on Jun. 15, 2020. The entire content of both applications is incorporated herein by reference in their entireties.

TECHNICAL FIELD

The present application relates to the field of display screens, and in particular, to a foldable display panel and a foldable display apparatus.

BACKGROUND

With extensive use of flexible display screens, foldable display panels have begun to be applied to some display apparatuses. Through disposing a foldable display panel, a display area of a display panel may be further increased, and folding, storage, and transportation of the display panel may be more convenient. A foldable display panel generally uses an outward bending manner. When the foldable display panel is in a bent state, a display screen (a main screen) facing a user is generally light-emitted for displaying content, and a display screen (a secondary screen) facing away from the user is not light-emitted, so as to reduce energy consumption. After a long period of folding, a light emitting device of the main screen is attenuated more severely than a light emitting device of the secondary screen. As a result, the main screen is aged faster than the secondary screen. When the display panel is unfolded for display, there is a color difference between the main screen and the secondary screen, resulting in a problem of non-uniform display.

SUMMARY

In view of this, embodiments of the present application provide a foldable display panel and a foldable display apparatus. When the foldable display panel is in a first state, the first display area is light-emitted and the second display area is not light-emitted. When the foldable display panel is in a second state, both the first display area and the second display area are light-emitted. Densities of drive currents of the first display area and the second display area which are connected in a foldable manner are set to be different when the first display area and the second display area are simultaneously light-emitted, that is, the density of the drive current of the second display area is greater than the density of the drive current of the first display area when the first display area and the second display area are in the second state. In this case, an aging speed of the second display area is accelerated by utilizing a relatively large density of the drive current, and an aging speed of the first display area is reduced by utilizing a relatively small density of the drive current. Therefore, in a usage state in which a light-emitting time of the first display area is longer than a light-emitting time of the second display area, a difference between the aging speed of the first display area and the aging speed of the second display area may be reduced as far as possible, thereby guaranteeing a consistency of display brightness between the first display area and the second display area, and further improving usage experience of users.

According to an aspect of the present application, an embodiment of the present application provides a foldable display panel, including: a first display area and a second display area which are connected in a foldable manner. The foldable display panel has a first state and a second state. When the foldable display panel is in the first state, the first display area is light-emitted and the second display area is not light-emitted. When the foldable display panel is in the second state, both the first display area and the second display area are light-emitted, and in a light-emitting period, a density of a drive current density of the second display area is greater than a density of a drive current density of the first display area.

According to another aspect of the present application, an embodiment of the present application provides a foldable display apparatus, including the foldable display panel according to any one of the foregoing aspects.

The embodiments of the present application provide the foldable display panel and the foldable display apparatus. The foldable display panel has the first state and the second state. When the foldable display panel is in the first state, the first display area is light-emitted and the second display area is not light-emitted. When the foldable display panel is in the second state, both the first display area and the second display area are light-emitted. Densities of drive currents of the first display area and the second display area which are connected in a foldable manner are set to be different when the first display area and the second display area are simultaneously light-emitted, that is, the density of the drive current of the second display area is greater than the density of the drive current of the first display area when the first display area and the second display area are in the second state. In this case, an aging speed of the second display area is accelerated by utilizing a relatively large density of the drive current, and an aging speed of the first display area is reduced by utilizing a relatively small density of the drive current. Therefore, in a usage state in which a light-emitting time of the first display area is longer than a light-emitting time of the second display area, a difference between the aging speed of the first display area and the aging speed of the second display area may be reduced as far as possible, thereby guaranteeing a consistency of display brightness between the first display area and the second display area, and further improving usage experience of users.

DETAILED DESCRIPTION

The technical schemes in the embodiments of the present disclosure will be described clearly and completely below in combination with the accompanying drawings in the embodiments of the present disclosure. Obviously, the described embodiments are only a part of the embodiments of the present disclosure, not all of the embodiments. Based on the embodiments in the present disclosure, all other embodiments obtained by those skilled in the art without creative efforts shall fall within the protection scope of the present disclosure.

In addition, in exemplary embodiments, same numerals denote same components with the same structure or same steps in a same method. Therefore, if an example of an embodiment is described, only structures or methods that are different from those in the described embodiment are described in other exemplary embodiments.

Throughout the specification and the claims, when a component is described as being "connected" to another component, the one component may be "directly connected" to the another component or "electrically connected" to the another component through a third component. Furthermore, unless explicitly described to the contrary, the term "comprising" and its corresponding terms should only be understood as including the stated components and should not be understood as excluding any other components.

Figure 1:
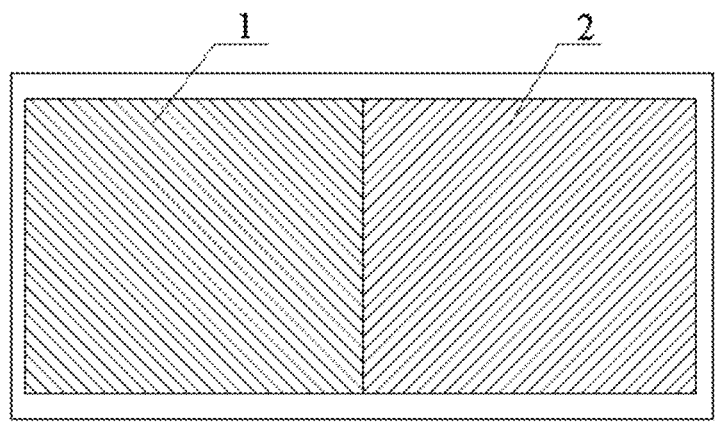
FIG. 1 is a schematic structural diagram of a foldable display panel according to an embodiment of the present application.

FIG. 1 is a schematic structural diagram of a foldable display panel according to an embodiment of the present application. As shown in FIG. 1, the foldable display panel includes a first display area 1 and a second display area 2 which are connected in a foldable manner. When the foldable display panel is in a first state, the first display area 1 is light-emitted and the second display area 2 is not light-emitted. When the foldable display panel is in a second state, both the first display area 1 and the second display area 2 are light-emitted, and in this case, a density of a drive current of the second display area 2 is greater than a density of a drive current of the first display area 1. The first state and the second state of the foldable display panel may be a fully folded state and a fully unfolded state, respectively. Alternatively, the first state and the second state may be states of being folded at other angles. For example, the first state may be a state of being folded at a preset angle, and the second state may be a state of being folded at another preset angle. For example, in the first state, the first display area 1 and the second display area 2 are in a state of being folded at 170 degrees, and in the second state, the first display area 1 and the second display area 2 are in a state of being folded at 10 degrees, as long as the foldable display panel have different folding angles when the foldable display panel are in the first state and the second state. A folding angle between the first display area 1 and the second display area 2 is not specifically limited in the present application. That the density of the drive current of the second display area 2 is greater than the density of the drive current of the first display area 1 refers to that within a time period of one frame, the drive current of each light emitting element in the second display area 2 is greater than the drive current of each light emitting element in the first display area 1. To be specific, one light-emitting period may be a time period of one frame. Since a light emitting device in a display panel may be attenuated or aged to a certain extent during a long-time usage process, and a light-emitting efficiency or a brightness of the light emitting device after the attenuation or the aging may also be reduced to a certain extent, that is, a light-emitting efficiency or a brightness of the display panel may be reduced after a long-time usage process, and a reduction trend of the light-emitting efficiency or the brightness corresponds to an attenuation curve of the light emitting device. For a same display panel, a display effect of the display panel may not be much affected as long as attenuation degrees of all light emitting devices are the same, and it is only required to increase output power or brightness to improve the display effect. However, for the foldable display panel, when the foldable display panel is in the unfolded state, the first display area 1 and the second display area 2 (which are referred to as a main screen and a secondary screen, respectively) are simultaneously lit up and light-emitted, and their attenuation degrees are basically the same. However, when the foldable display panel is in the folded state, generally, the first display area 1 is lit up and light-emitted, but the second display area 2 is not lit up and is not light-emitted. In this case, a light emitting device of the first display area 1 which is lit up is attenuated, but a light emitting device of the second display area 2 which is not lit up is not attenuated, resulting in an inconsistency of attenuation or aging degree between the first display area 1 and the second display area 2. In addition, after a long period of folding, an obvious difference of attenuation or aging degree is caused between the first display area 1 and the second display area 2, resulting in an inconsistency of display brightness between the first display area 1 and the second display area 2 when the display panel is in the unfolded state, further affecting a display effect. In this embodiment of the present application, the density of the drive current of the second display area 2 is set to be greater than the density of the drive current of the first display area 1, so that an attenuation or an aging speed of the light emitting device in the second display area 2 is accelerated relative to the light emitting device in the first display area 1, and when the first display area 1 and the second display area 2 are unfolded (that is, when the first display area 1 and the second display area 2 are simultaneously lit up and light-emitted), the density of the drive current of the second display area 2 is greater than the density of the drive current of the first display area 1, which implements that an attenuation or an aging speed of the second display area 2 is greater than an attenuation or an aging speed of the first display area 1 in this state, thereby ensuring that an attenuation or an aging degree of the entire second display area 2 which is lit up and light-emitted only when the foldable display panel is unfolded is the same as or similar to an attenuation or an aging degree of the entire first display area 1 which is lit up and light-emitted when the foldable display panel is unfolded and folded, and guaranteeing an uniformity of display brightness between the first display area 1 and the second display area 2. In this embodiment of the present application, the first display area 1 and the second display area 2 may be two areas of an entire display screen, or may be two mutually independent display screens, which is not limited in this embodiment of the present application.

A foldable display panel provided in this embodiment of the present application has the first state and the second state. When the foldable display panel is in the first state, the first display area is light-emitted and the second display area is not light-emitted. When the foldable display panel is in the second state, both the first display area and the second display area are light-emitted. Densities of drive currents of the first display area and the second display area which are connected in a foldable manner are set to be different when the first display area and the second display area are simultaneously light-emitted, that is, the density of the drive current of the second display area is greater than the density of the drive current of the first display area when the foldable display panel is in the second state. In this case, the aging speed of the second display area is accelerated by utilizing a relatively large density of the drive current, and the aging speed of the first display area is reduced by utilizing a relatively small density of the drive current. Therefore, in a usage state in which a light-emitting time of the first display area is longer than a light-emitting time of the second display area, a difference of aging speeds between the first display area and the second display area may be reduced as far as possible, thereby guaranteeing a consistency of display brightness between the first display area and the second display area, and further improving usage experience of users.

In an embodiment, a duty ratio of the drive current in the first display area 1 may be less than a duty ratio of the drive current in the second display area 2. Generally, the drive current of a display panel is a square wave formed by a high electrical level and a low electrical level which are generated alternately. Therefore, a magnitude of the density of the drive current may be changed by controlling the duty ratio of the square wave, that is, in this embodiment of the present application, the duty ratio of the drive current in the second display area 2 may be increased and/or the duty ratio of the drive current in the first display area 1 may be reduced, so as to increase the density of the drive current of the second display area 2 and/or reduce the density of the drive current of the first display area 1. In an embodiment, the foldable display panel includes a first light emitting device in the first display area 1 and a second light emitting device in the second display area 2. When the foldable display panel is in the second state, in a light-emitting period, a light-emitting time of the second light emitting device may be shorter than a light-emitting time of the first light emitting device. An attenuation degree of the light emitting device of the display panel is positively correlated with a usage time of the light emitting device, that is, the longer the usage time is, the more severely the light emitting device is attenuated, under a condition of a same light-emitting power, a light-emitting efficiency of the light emitting device which is attenuated more severely is lower, resulting in a lower brightness during display. Therefore, in this embodiment of the present application, a light-emitting time of the first light emitting device located in the first display area 1 in the second state is set to be longer than a light-emitting time of the second light emitting device located in the second display area 2 in the second state. On a premise of guaranteeing a consistency of display brightness between the first display area 1 and the second display area 2 in the unfolded state, in order to meet a condition that the light-emitting time of the first light emitting device is longer than the light-emitting time of the second light emitting device, it is required that a density of the drive current of the second light emitting device is increased, to guarantee display brightness of the first display area 1 and the second display area 2, thereby accelerating an attenuation speed of the second light emitting device, thereby implementing consistency or basic consistency of attenuation degrees between the first light emitting device and the second light emitting device, and improving the display effect of the foldable display panel in the unfolded state.

In an embodiment, when the foldable display panel is in the second state, the density of the drive current of the first display area 1 is determined based on an aging degree of the first light emitting device, and the density of the drive current of the first display area 1 may be negatively correlated with the aging degree of the first light emitting device. In an embodiment, when the foldable display panel is in the second state, the density of the drive current density of the second display area 2 is determined based on an aging degree of the second light emitting device, and the density of the drive current of the second display area 2 may be negatively correlated with the aging degree of the second light emitting device. Since an aging degree of a light emitting device is positively correlated with a usage time, that is, the longer the usage time is, the more severely the light emitting device is aged. In addition, the aging speed of the light emitting device is positively correlated with the magnitude of a drive current, that is, the larger the density of the drive current is, the faster the light emitting device is aged. However, a usage time of the first display area 1 is longer than a usage time of the second display area 2. Therefore, in order to guarantee a consistency of aging degrees between the first display area 1 and the second display area 2, there is a need to increase the density of the drive current of the second display area 2 and/or reduce the density of the drive current of the first display area 1, thereby keeping the aging degree of the first display area 1 the same or similar to the aging degree of the second display area 2, and guaranteeing a display brightness and a display effect of the entire foldable display panel.

In an embodiment, when the foldable display panel is in the second state, in a same light-emitting period, a ratio of the light-emitting time of the first light emitting device to the light-emitting time of the second light emitting device may be equal to a ratio of an aging degree of the first light emitting device to an aging degree of the second light emitting device.

For different users, the usage time of the first light emitting device is different from the usage time of the second light emitting device. Therefore, in order to better meet public demands, in this embodiment of the present application, the ratio of the aging degree of the first light emitting device to the aging degree of the second light emitting device (it may be learned from the foregoing analysis that the aging degree of the light emitting device is positively correlated with the usage time) may be calculated based on an average usage time of the first light emitting device and an average usage time of the second light emitting device. Then, based on this ratio, the ratio of the light-emitting time of the first light emitting device to the light-emitting time of the second light emitting device in the unfolded state is determined, to guarantee a consistency of aging degrees between the first light emitting device and the second light emitting device as far as possible.

In this embodiment of the present application, different ratios of the light-emitting time of the first light emitting device to the light-emitting time of the second light emitting device may be selected according to actual requirements of application scenarios. The ratio of the light-emitting time of the first light emitting device to the light-emitting time of the second light emitting device may be a preset ratio. The preset ratio may be a preset value. For example, the ratio of the light-emitting time of the first light emitting device to the light-emitting time of the second light emitting device may be a preset fixed value, or may be a preset changing value, for example, a changing value related to time, which may better maintain a consistency of aging degrees between the first light emitting device and the second light emitting device, as long as a selected ratio of the light-emitting time of the first light emitting device to the light-emitting time of the second light emitting device can maintain a difference of the aging degrees between the first light emitting device and the second light emitting device within a specific range. A specific ratio of the light-emitting time of the first light emitting device to the light-emitting time of the second light emitting device is not limited in this embodiment of the present application.

In an embodiment, when the first display area 1 and the second display area 2 are in the second state, the ratio of the light-emitting time of the first light emitting device to the light-emitting time of the second light emitting device has been set and generally cannot be randomly changed by users. To better guarantee a consistency of display brightness between the first display area 1 and the second display area 2, the ratio of the light-emitting time of the first light emitting device to the light-emitting time of the second light emitting device may be adjusted periodically.

In an embodiment, a ratio of display brightness of the first display area 1 to display brightness of the second display area 2 may be detected in real time, to adjust the ratio of the light-emitting time of the first light emitting device to the light-emitting time of the second light emitting device based on the ratio of the display brightness of the first display area 1 to the display brightness of the second display area 2.

In an embodiment, the ratio of the aging degree of the first light emitting device to the aging degree of the second light emitting device may be detected in real time, to adjust the ratio of the light-emitting time of the first light emitting device to the light-emitting time of the second light emitting device based on the ratio of the aging degree of the first light emitting device to the aging degree of the second light emitting device.

A usage situation of the first display area 1 and the second display area 2 is detected in real time, to adjust the ratio of the light-emitting time of the first light emitting device to the light-emitting time of the second light emitting device, thereby better maintaining a consistency of aging degrees between the first light emitting device and the second light emitting device.

Figure 2:
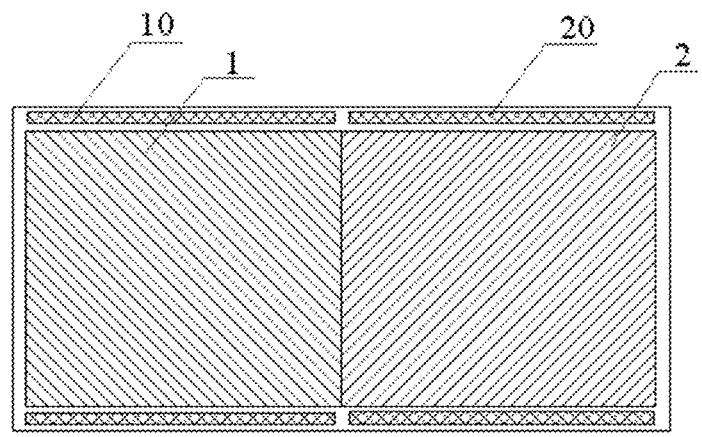
FIG. 2 is a schematic structural diagram of a foldable display panel according to another embodiment of the present application, where the foldable display panel may include a first drive circuit in a first display area, the first drive circuit drives the first display area to be light-emitted, the foldable display panel may include a second drive circuit in a second display area, and the second drive circuit drives the second display area to be light-emitted.

FIG. 2 is a schematic structural diagram of a foldable display panel according to another embodiment of the present application. As shown in FIG. 2, on a basis of the embodiment illustrated in FIG. 1, in the embodiment illustrated in FIG. 2, the foldable display panel may include a first drive circuit 10 in the first display area 1, the first drive circuit 10 drives the first display area 1 to be light-emitted, the foldable display panel may include a second drive circuit 20 in the second display area 2, and the second drive circuit 20 drives the second display area 2 to be light-emitted. Since the first drive circuit 10 and the second drive circuit 20 which are mutually independent are disposed, the first light emitting device of the first display area 1 and the second light emitting device of the second display area 2 may be independently driven. Therefore, on a premise of implementing that the first display area 1 and the second display area 2 are light-emitted independently and simultaneously, it may also be ensured that when the first display area 1 and the second display area 2 are simultaneously light-emitted, the first display area 1 and the second display area 2 may have different drive currents and light-emitting time by using the first drive circuit 10 and the second drive circuit 20, respectively.

Figure 3:
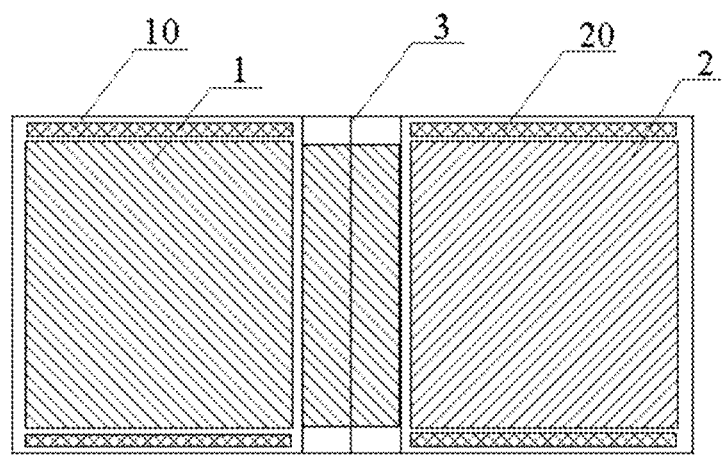
FIG. 3 is a schematic structural diagram of a foldable display panel according to another embodiment of the present application, where the foldable display panel may further include a folding area which connects a first display area and a second display area.

FIG. 3 is a schematic structural diagram of a foldable display panel according to another embodiment of the present application. As shown in FIG. 3, the foregoing foldable display panel may further include a folding area 3 which connects the first display area 1 and the second display area 2, and the foldable display panel is folded or unfolded in the folding area 3 to implement a switching between the first state and the second state. In an embodiment, when the foldable display panel is in the first state, the folding area 3 is light-emitted; and when the foldable display panel is in the second state, the density of the drive current of the folding area 3 is equal to the density of the drive current of the first display area 1. When the foldable display panel is in the second state, the folding area 3 is light-emitted. In this embodiment, it may be set that the folding area 3 is driven by the first drive circuit 10, that is, the density of the drive current of the folding area 3 is the same as the density of the drive current of the first display area 1. In an embodiment, when the foldable display panel is in the first state, the folding area 3 is not light-emitted; and when the foldable display panel is in the second state, the density of the drive current of the folding area 3 is equal to the density of the drive current of the second display area 2. When the foldable display panel is in the second state, the folding area 3 is not light-emitted. In this embodiment, it may be set that the folding area 3 is driven by the second drive circuit 20, that is, the density of the drive current of the folding area 3 is the same as the density of the drive current of the second display area 2. In this embodiment of the present application, a lighting opportunity of the folding area 3 may be selected according to actual requirements of application scenarios, and an independent drive circuit may be disposed for driving the folding area 3, to guarantee independent driving of the folding area 3, which is not limited in the present application. In this embodiment of the present application, the folding area 3, the first display area 1, and the second display area 2 may be different parts of a whole, or may be three mutually independent parts, where the same whole uses a same set of drive circuits for driving.

A foldable display apparatus provided in an embodiment of the present application may include the foldable display panel according to any one of the foregoing embodiments.

According to the foldable display apparatus provided in this embodiment of the present application, the foldable display panel has the first state and the second state. When the foldable display panel is in the first state, the first display area is light-emitted and the second display area is not light-emitted. When the foldable display panel is in the second state, both the first display area and the second display area are light-emitted. Densities of drive currents of the first display area and the second display area which are connected in a foldable manner are set to be different when the first display area and the second display area are simultaneously light-emitted, that is, the density of the drive current of the second display area is greater than the density of the drive current of the first display area when the first display area and the second display area are in the second state. In this case, an aging speed of the second display area is accelerated by utilizing a relatively large density of the drive current, and an aging speed of the first display area is reduced by utilizing a relatively small density of the drive current. Therefore, in a usage state in which a light-emitting time of the first display area is longer than a light-emitting time of the second display area, a difference of aging speeds between the first display area and the second display area may be reduced as far as possible, thereby guaranteeing a consistency of display brightness between the first display area and the second display area, and further improving usage experience of users.

The above embodiments are only the preferred embodiments of the present disclosure, and are not intended to limit the protection scope of the present disclosure. Any modifications, equivalent replacements, improvements, etc. made within the spirit and principles of the present disclosure should be included within the protection scope of the present disclosure.

What is claimed is:

1. A foldable display panel, comprising:
a first display area and a second display area which are connected in a foldable manner, wherein
when the foldable display panel is in a first state, the first display area is light-emitted and the second display area is not light-emitted; and
when the foldable display panel is in a second state, both the first display area and the second display area are light-emitted, and in a light-emitting period, a density of a drive current of the second display area is greater than a density of a drive current of the first display area.

2. The foldable display panel according to claim 1, wherein a duty ratio of the drive current in the first display area is less than a duty ratio of the drive current in the second display area.

3. The foldable display panel according to claim 1, wherein the foldable display panel comprises a first light emitting device in the first display area and a second light emitting device in the second display area, and when the foldable display panel is in the second state, in a light-emitting period, a light-emitting time of the second light emitting device is shorter than a light-emitting time of the first light emitting device.

4. The foldable display panel according to claim 3, wherein when the foldable display panel is in the second state, the density of the drive current of the first display area is determined based on an aging degree of the first light emitting device, and the density of the drive current of the first display area is negatively correlated with the aging degree of the first light emitting device.

5. The foldable display panel according to claim 3, wherein when the foldable display panel is in the second state, the density of the drive current of the second display area is determined based on an aging degree of the second light emitting device, and the density of the drive current of the second display area is negatively correlated with the aging degree of the second light emitting device.

6. The foldable display panel according to claim 3, wherein when the foldable display panel is in the second state, in a same light-emitting period, a ratio of the light-emitting time of the first light emitting device to the light-emitting time of the second light emitting device is equal to a ratio of an aging degree of the first light emitting device to an aging degree of the second light emitting device.

7. The foldable display panel according to claim 6, wherein a ratio of an average usage time of the first light emitting device to an average usage time of the second light emitting device is equal to the ratio of the aging degree of the first light emitting device to the aging degree of the second light emitting device.

8. The foldable display panel according to claim 6, wherein the ratio of the light-emitting time of the first light emitting device to the light-emitting time of the second light emitting device comprises a preset ratio.

9. The foldable display panel according to claim 6, wherein the ratio of the light-emitting time of the first light emitting device to the light-emitting time of the second light emitting device is obtained through an adjustment based on the ratio of the aging degree of the first light emitting device to the aging degree of the second light emitting device.

10. The foldable display panel according to claim 6, wherein the ratio of the light-emitting time of the first light emitting device to the light-emitting time of the second light emitting device is adjusted periodically.

11. The foldable display panel according to claim 1, wherein the foldable display panel comprises a first drive circuit in the first display area, and the first drive circuit drives the first display area to be light-emitted; and the foldable display panel comprises a second drive circuit in the second display area, and the second drive circuit drives the second display area to be light-emitted.

12. The foldable display panel according to claim 1, wherein the first state comprises a fully folded state, and the second state comprises a fully unfolded state.

13. The foldable display panel according to claim 1, wherein the first state comprises a state of being folded at a preset angle, and/or the second state comprises a state of being folded at another preset angle.

14. The foldable display panel according to claim 1, further comprising a folding area which connects the first display area and the second display area, wherein the foldable display panel is folded or unfolded in the folding area to implement a switching between the first state and the second state.

15. The foldable display panel according to claim 14, wherein when the foldable display panel is in the first state, the folding area is light-emitted; and when the foldable display panel is in the second state, a density of a drive current of the folding area is equal to the density of the drive current of the first display area.

16. The foldable display panel according to claim 14, wherein when the foldable display panel is in the first state, the folding area is not light-emitted; and when the foldable display panel is in the second state, a density of a drive current of the folding area is equal to the density of the drive current of the second display area.

17. A foldable display apparatus, comprising the foldable display panel according to claim 1.

* * * * *